No. 661,827. Patented Nov. 13, 1900.
C. E. STONE.
STIFFENING PLATE FOR VEHICLE SHAFTS.
(Application filed Sept. 17, 1900.)
(No Model.)
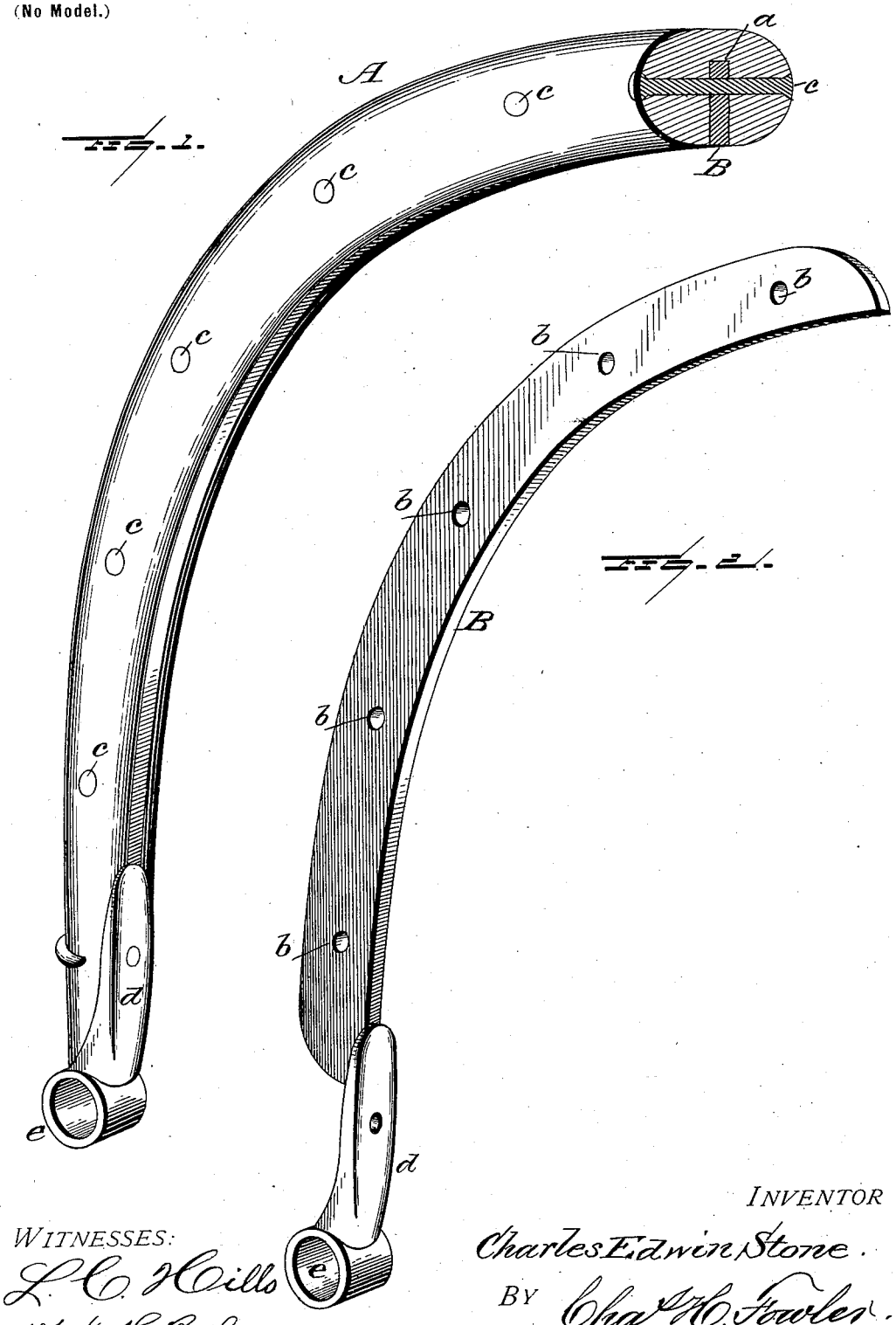
INVENTOR
Charles Edwin Stone.
BY Chas. H. Fowler
Attorney
WITNESSES:

United States Patent Office.

CHARLES EDWIN STONE, OF AMESBURY, MASSACHUSETTS, ASSIGNOR OF ONE-HALF TO THE AMESBURY PNEUMATIC GEAR COMPANY, OF SAME PLACE.

STIFFENING-PLATE FOR VEHICLE-SHAFTS.

SPECIFICATION forming part of Letters Patent No. 661,827, dated November 13, 1900.

Application filed September 17, 1900. Serial No. 30,302. (No model.)

*To all whom it may concern:*

Be it known that I, CHARLES EDWIN STONE, a citizen of the United States, residing at Amesbury, in the county of Essex and State of Massachusetts, have invented certain new and useful Improvements in Braces or Stiffening-Plates for Vehicle-Shafts; and I do hereby declare that the following is a full, clear, and exact description of the same, reference being had to the annexed drawings, making a part of this specification, and to the letters of reference marked thereon.

The present invention has for its object to improve the construction of vehicle-shafts, whereby the same are materially strengthened at their curved or rear ends, rendered more durable, and presenting a neat and finished appearance at that end of the shaft where it couples to the vehicle, as will be hereinafter described and claimed.

Figure 1 of the drawings is a perspective view of the curved end of a vehicle-shaft embodying my invention, the outer end of said shaft being shown in section; Fig. 2, a detail view in perspective of the brace or stiffening-plate.

In the accompanying drawings, A represents the curved or rear end of a wooden vehicle-shaft of the usual construction in which is formed a slot, kerf, or mortise $a$. I prefer to form a mortise extending only a part way through the shaft and continuing throughout the length of the curve, or nearly so, of said shaft, the mortise extending in a direction diametrically and also lengthwise of the shaft and may be of any preferred depth to correspond with the width of the brace or stiffening-plate B. This plate B is preferably of steel and may be of any desirable length and thickness and having a curve to correspond with the curve of the end of the shaft to which it is to be connected, said plate having a plurality of holes or perforations $b$, through which suitable screws or rivets $c$ extend as a means of securing the plate to the shaft.

I do not wish to be understood as limiting my invention to any special means for holding the brace or stiffening-plate in the mortise and fastening it to the shaft, as any suitable and well-known means may be employed as found most desirable.

The plate B at its inner end has a shank $d$ integral therewith and terminating at its outer extremity in a suitable shaft-eye $e$ of the usual construction.

The end of the brace or stiffening-plate B may be provided with any suitable and well-known means necessary to form in part the coupling between the shafts and fore axle of the vehicle, the eye $e$ being shown to illustrate one of many means that may be used.

The plate B enters the curved end of the shaft both diametrically and lengthwise thereof, thereby materially strengthening the curved end of the shaft and reducing its weight over the ordinary shaft-irons, and also secures greater rigidity and stiffness to the end of the shaft, and being edgewise with relation to the shaft the plate is capable of being secured to the shaft with comparatively little trouble and expenditure of time, and when so applied the shaft will have a neat and finished appearance with all the strength and durability necessary in a vehicle-shaft at its curved or coupling end.

It will be noticed that the brace or strengthening-plate B is curved edgewise in contradistinction to flatwise, thereby bringing the coupling-eye in proper position when the plate is secured in the shaft, the eye being integral with the plate and at a right angle to the flat side thereof.

Having now fully described my invention, what I claim as new, and desire to secure by Letters Patent, is—

1. A curved brace or stiffening-plate for vehicle-shafts, said plate having flat sides and curved edgewise and adapted to enter the body of the shaft and terminating at its inner end in means necessary to form in part a coupling between said shaft and axle, said means being integral with the plate, substantially as and for the purpose set forth.

2. A curved brace or stiffening-plate for vehicle-shafts, said plate having flat sides and curved edgewise and adapted to enter the body of the shaft and terminating at its inner end in a coupling-eye, said eye being integral with the plate and at a right angle to the sides thereof, substantially as and for the purpose specified.

3. A curved brace or stiffening-plate for vehicle-shafts, said plate having flat sides and curved edgewise and adapted to enter the body of the shaft and terminating at its inner end in a shank with coupling-eye integral with the plate, substantially as and for the purpose described.

4. A vehicle-shaft having its inner end formed with a slot, kerf or mortise and a brace or stiffening-plate seated therein, said plate being curved edgewise and terminating at its inner end in suitable means integral therewith and necessary to form in part a coupling between the shaft and axle, substantially as and for the purpose set forth.

In testimony that I claim the above I have hereunto subscribed my name in the presence of two witnesses.

CHARLES EDWIN STONE.

Witnesses:
   DUDLEY J. MARSTON,
   EDWARD P. WALLACE.